(No Model.)
A. G. WATERHOUSE.
ELECTRIC METER.
No. 483,189. Patented Sept. 27, 1892.
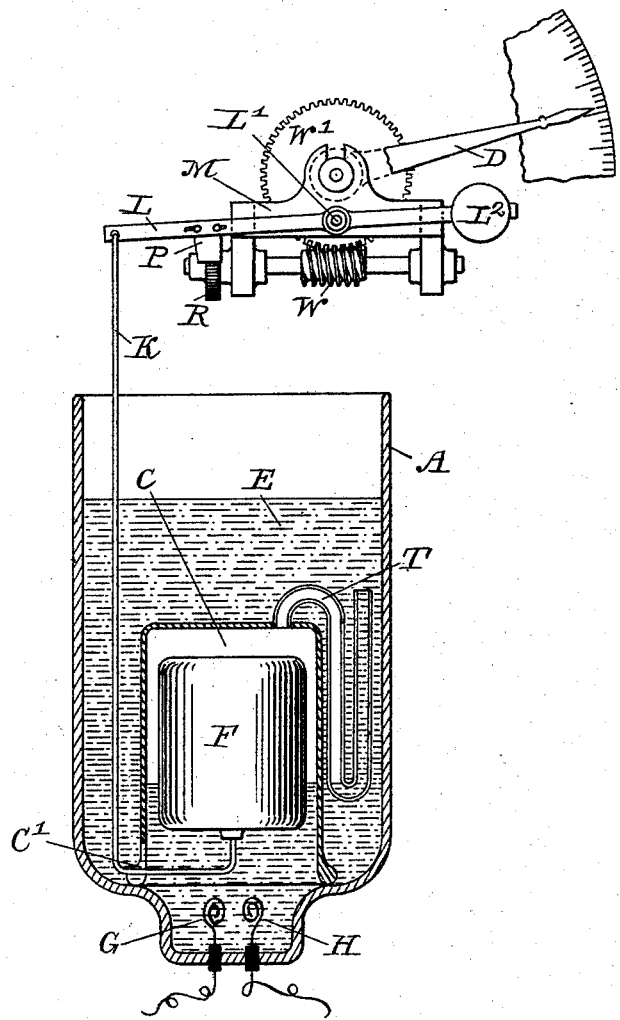
Witnesses:
John M Lord
Frank G. Waterhouse
Inventor:
Addison G. Waterhouse

UNITED STATES PATENT OFFICE.

ADDISON G. WATERHOUSE, OF HARTFORD, CONNECTICUT.

ELECTRIC METER.

SPECIFICATION forming part of Letters Patent No. 483,189, dated September 27, 1892.

Application filed January 4, 1892. Serial No. 416,929. (No model.)

*To all whom it may concern:*

Be it known that I, ADDISON G. WATERHOUSE, a citizen of the United States, residing at the city of Hartford, in the State of Connecticut, have invented new and useful Improvements in Electric Meters, of which the following is a specification.

The object of my invention is for measuring and registering the volume of gas which passes through the meter. This gas may be of any form of gas and be conducted to and from the meter by means of pipes, or it may be generated inside of the meter by the action of an electric current acting upon an electrolyte.

My present invention relates to certain improvements upon an invention made by me and described in Letters Patent No. 464,683, dated December 8, 1891, in which gas is collected in a gas-collector which has within itself the elements for discharging the gas from the collector after a certain amount of gas has been collected; and my present invention consists of means for registering the number of times the gas has been collected and discharged from such collector.

In order to better describe my invention, reference will be had to the accompanying drawing, in which is shown an electrolytic gas-meter adapted for measuring gas produced by an electric current.

A is an electrolytic cell containing a fluid electrolyte E. At the bottom of the cell are two electrodes G and H, between which an electric current passes and in doing so evolves ions or gases which correspond in volume to the work of the current. In order to measure this gas, I have placed inside the jar A a gas-collector C, placed over the electrodes G and H, or either one of them, so that the gas which arises from the electrode or electrodes will be collected in C. In connection with C, I have a self-discharging inverted siphon-tube T, which is capable of discharging the gas from collector C after a certain amount of gas has accumulated in it.

In order to register each time the collector C has been filled with gas and the same discharged, I place a float F inside of C and connect to the float F a wire K, which passes under collector C at a point C', where it is cut away in order to allow the rod K to move up and down. The rod K extends up and is connected to a lever L, so that as the collector C is filled with fluid the float F is buoyed up, and it, acting through the rod K, raises the lever L, and as C is filled with gas the float F moves down by gravitation and causes the lever L to swing down with it, so that each time the collector C is filled with gas and emptied it causes the lever to move once each way. The lever L is pivoted on the frame M at L' and has a counter-balance $L^2$ at the opposite end, in order to partly counterbalance the weight of the float F and rod K. The lever L is provided with a pawl P, which engages in a ratchet-wheel R and causes this wheel to rotate one tooth each time the lever L moves up and down. Connected to wheel R is a worm-screw W, which meshes in the worm-wheel W'. To the spindle of the wheel W' is a pointer D, which revolves with W' and points on a dial (not shown) to figures which show the movement of the pointer D, and consequently record the number of times that C has been filled with gas and emptied, thereby registering the quantity of gas that has passed through C, indicating the electrical energy expended in producing the recorded amount of gas. I have shown the float F connected to the lever of the recording mechanism by means of a rod K; but it is plain that other means and forms of connections may be used, either of a mechanical or electrical and magnetic nature, whereby the rise and fall of the float F may be connected to the recording mechanism.

What I claim as my invention is—

An electric meter consisting of a vessel adapted to hold a fluid electrolyte provided with electrodes, a gas-collector placed over one or both of said electrodes, said collector being provided with a tube or gas-passage leading from the upper interior of the gas-collector, having the elements within itself for discharging the gas from the collector after a certain amount has been collected, in combination with a float placed within said gas-collector and being provided with connections through which the movement of the float is imparted to a recording mechanism, substantially as and for the purposes set forth.

ADDISON G. WATERHOUSE.

Witnesses:
ARTHUR H. LYNCH,
FRANK G. WATERHOUSE.